(12) United States Patent
Miyazaki et al.

(10) Patent No.: US 7,084,746 B2
(45) Date of Patent: Aug. 1, 2006

(54) OBSTACLE DETECTION DEVICE

(75) Inventors: Hideto Miyazaki, Tokyo (JP); Toyoaki Kitano, Tokyo (JP)

(73) Assignee: Mitsubishi Denki Kabushiki Kaisha, Toyko (JP)

( * ) Notice: Subject to any disclaimer, the term of this patent is extended or adjusted under 35 U.S.C. 154(b) by 15 days.

(21) Appl. No.: 10/819,909

(22) Filed: Apr. 8, 2004

(65) Prior Publication Data
US 2004/0201674 A1    Oct. 14, 2004

(30) Foreign Application Priority Data
Apr. 10, 2003   (JP)   ............................ 2003-106869

(51) Int. Cl.
*B60Q 21/00* (2006.01)

(52) U.S. Cl. ...................... 340/436; 340/936; 340/435; 340/437; 340/932.2

(58) Field of Classification Search ................ 340/936, 340/436, 435, 437, 932.2
See application file for complete search history.

(56) References Cited

U.S. PATENT DOCUMENTS 6,593,960 B1 *   7/2003   Sugimoto et al. ........... 348/148
6,693,518 B1 *   2/2004   Kumata et al. ............. 340/435
2002/0005896 A1  1/2002   Kumata et al.
2002/0181803 A1* 12/2002  Kawakami et al. ......... 382/293

FOREIGN PATENT DOCUMENTS

| CN | 1285690    | 2/2001  |
|----|------------|---------|
| DE | 19801884   | 7/1999  |
| DE | 19940723   | 3/2001  |
| DE | 10031590   | 1/2002  |
| EP | 1 004 916  | 5/2000  |
| EP | 1 197 937  | 11/2001 |
| JP | 06-064478 A| 3/1994  |
| JP | 2002-29316 A| 1/2002 |
| JP | 2002063699 | 2/2002  |
| JP | 2003023623 | 1/2003  |

OTHER PUBLICATIONS

Chinese Office Action dated Jan. 6, 2006.

* cited by examiner

*Primary Examiner*—Darly C Pope
(74) *Attorney, Agent, or Firm*—Sughrue Mion, PLLC

(57) ABSTRACT

An obstacle detection device includes: a hyperboloidal mirror contained near a tip of a pole mounted at the corner of a vehicle; an image pickup unit for picking up an image shown in the hyperboloidal mirror; a signal processing circuit that performs an image signal processing for allowing easy viewability of the image picked up by the image pickup unit; and a display unit that is mounted in the vehicle compartment of the vehicle and displays the image signal processed by the signal processing circuit.

13 Claims, 16 Drawing Sheets

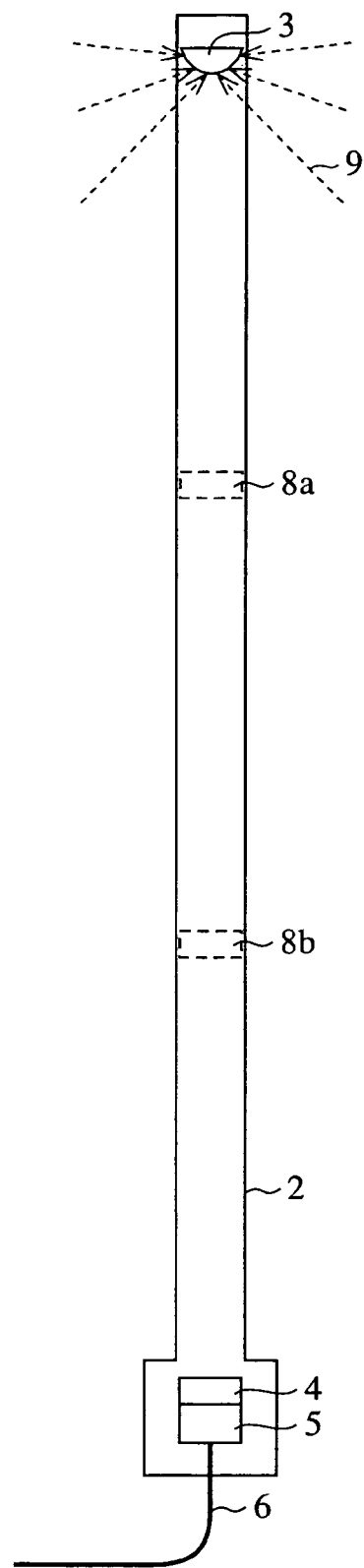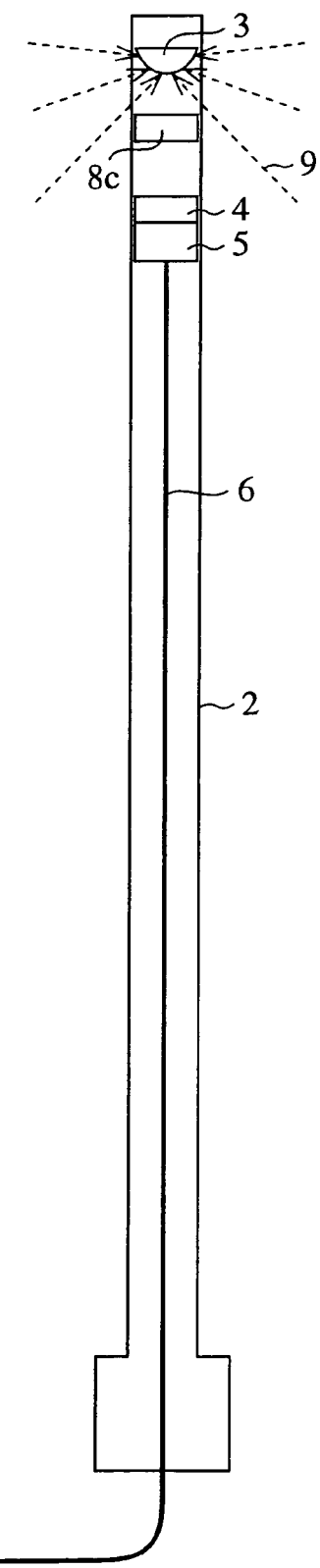

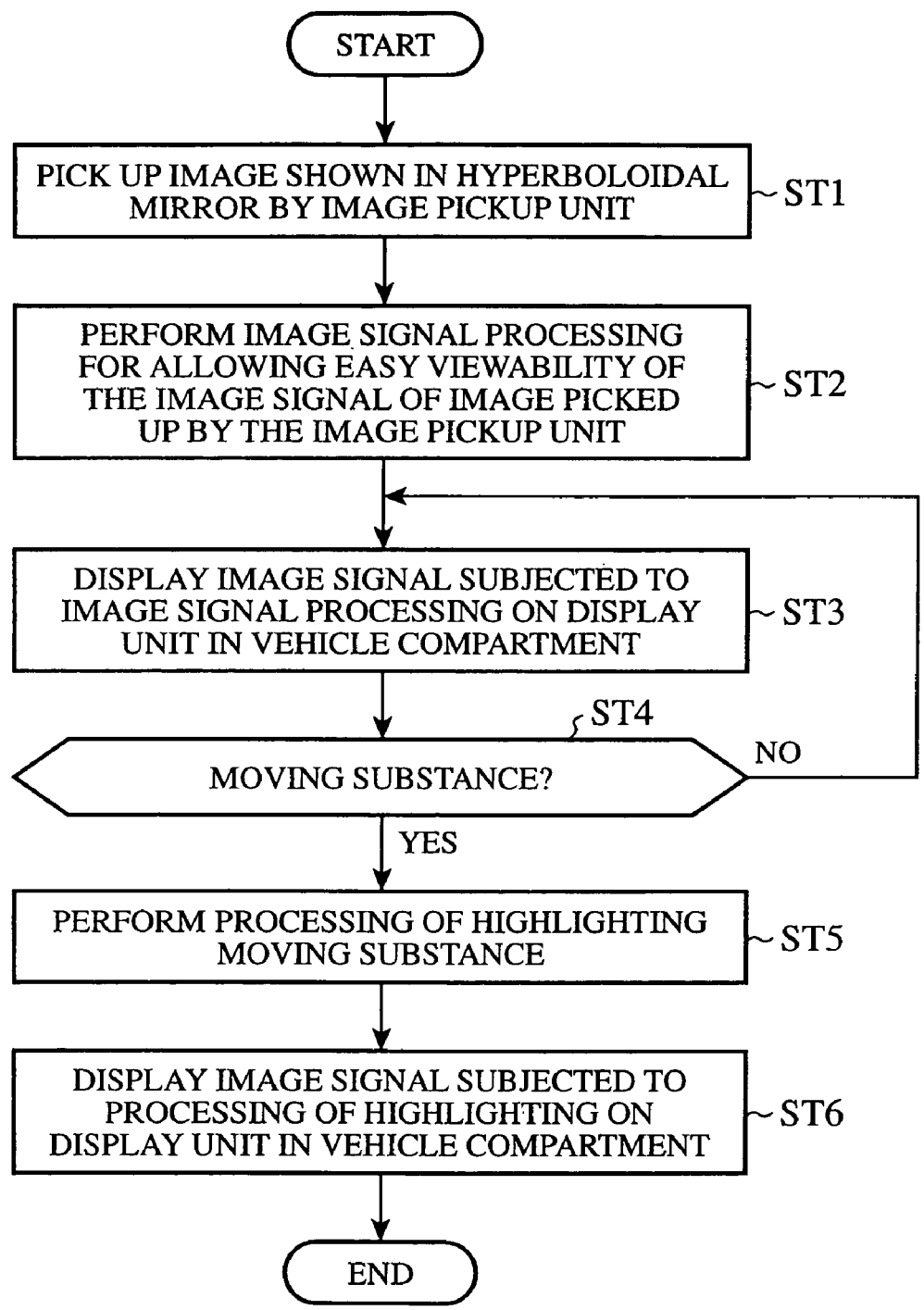

FIG.22
(24a-1)
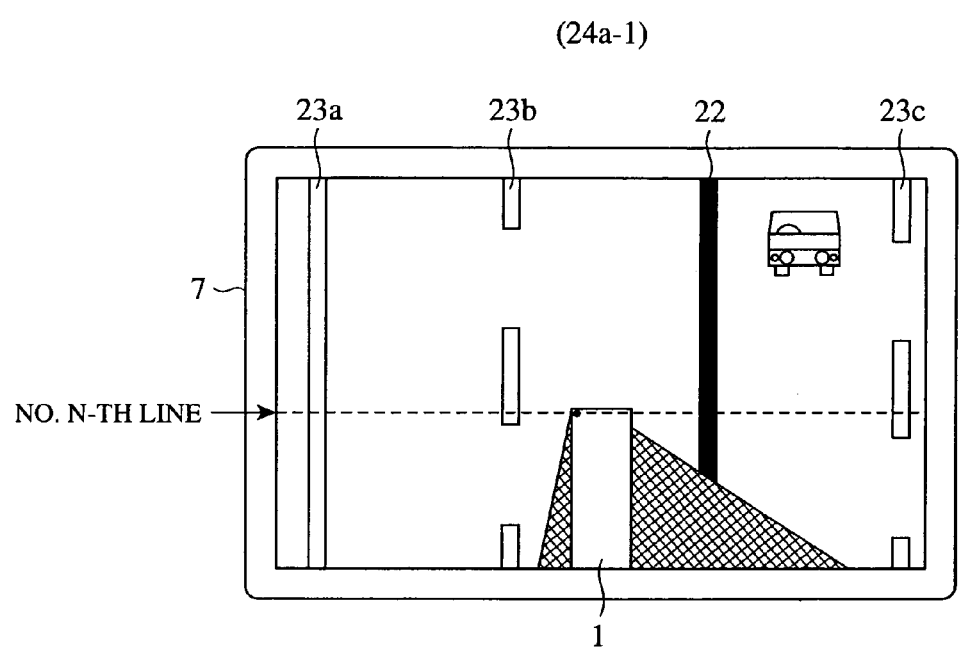
(24a-2)
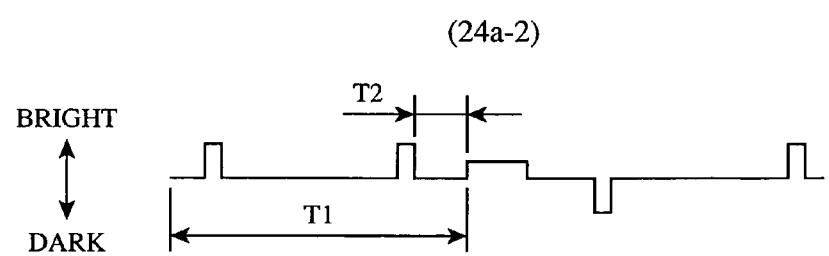

FIG.23
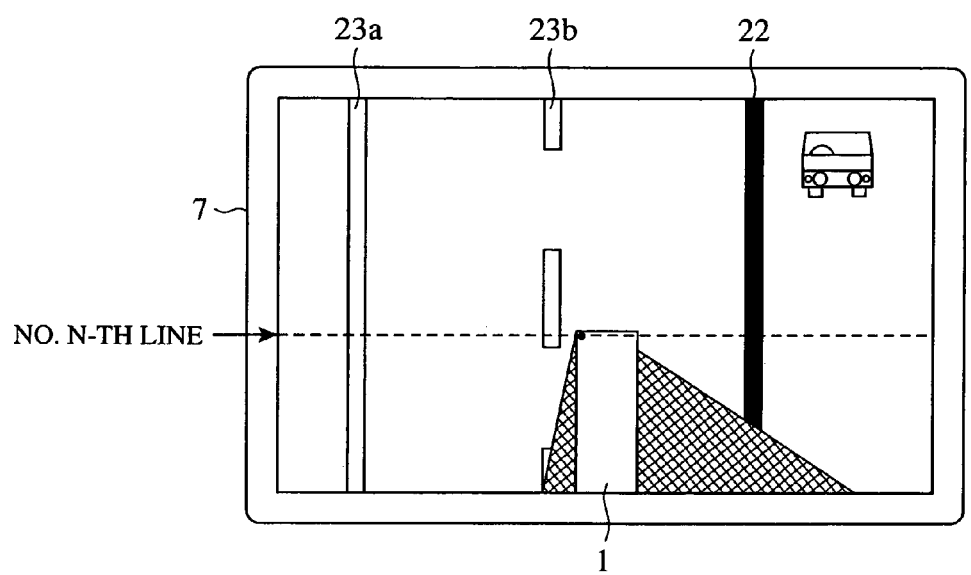
(24b-1)
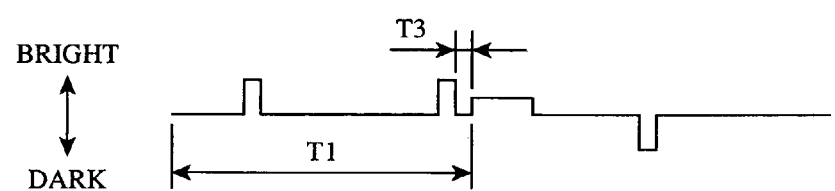
(24b-2)

OBSTACLE DETECTION DEVICE

BACKGROUND OF THE INVENTION

1. Field of the Invention

The present invention relates to an obstacle detection device and, in particular, to an obstacle detection device capable of checking an obstacle in the blind corner of a vehicle with a simple device.

2. Description of the Related Art

Conventional blind corner check devices include one that utilizes a method of picking up an image by capturing a landscape in an image sensor through a lens and uses two image sensors in order to widen a field of view and has a pole mounted at the corner of a vehicle body, whose shape is like a trunk antenna of the so called automobile mobile telephone (for example, see patent document 1).

Moreover, conventional vehicle mounted left-right check devices include one that utilizes a method of picking up an image by capturing a landscape in an image sensor through a lens and is made capable of checking obstacles in both left and right directions in forward of a vehicle by a pair of devices which has a lens focusing on an image pickup unit arranged in the whole portion of a pole (for example, see patent document 2).

[Patent Document 1] Japanese Unexamined Patent Publication No. 2002-29316

[Patent Document 2] Japanese Unexamined Patent Publication No. Hei 6-64478

Since the conventional blind corner check devices are composed in the above described manner, they present the following problems: an image needs to be picked up by capturing a landscape in an image sensor through a lens and a set of image pickup system can pick up only as narrow a region as 180 degrees or less, so two image sensors need to be used so as to widen the field of view, which results in increasing cost; and in addition, the pole mounted at the corner of vehicle body needs to be shaped like the trunk antenna and hence is undesirable in terms of styling and cannot be retractable when unnecessary.

Moreover, since the conventional vehicle mounted left-right check devices are composed in the above described manner, they present the following problems: a set of image pickup system can pick up only as narrow a region as 180 degrees or less, as is the case with the above blind corner check device, and obstacles in a left and right directions in forward of the vehicle need to be checked by a pair of devices, which results in increasing cost and works of mounting and wiring; both sides of the vehicle body cannot be checked; and the lens focusing on the image pickup unit needs to be arranged in the whole portion of the pole, which results in making it difficult to realize a multi steps electrical retractable pole.

SUMMARY OF THE INVENTION

The present invention has been made to solve the above problems. The object of the present invention is to provide an obstacle detection device that can widen the field of view by and is excellent in terms of styling and can have its pole easily retracted when unnecessary and in addition can respond to an electrically retractable pole with an inexpensive and simple structure.

An obstacle detection device in accordance with the present invention includes: a hyperboloidal mirror contained near a tip of a pole mounted at the corner of a vehicle; an image pickup unit for picking up an image shown in the hyperboloidal mirror; a signal processing circuit that performs an image signal processing for allowing easy viewability of the image picked up by the image pickup unit; and a display unit that is mounted in the vehicle compartment of the vehicle and displays the image signal processed by the signal processing circuit.

Therefore, in accordance with the present invention, it is possible to check obstacles in the blind corner of the vehicle with reliability by a simple and inexpensive structure and hence to produce an effect of contribution to safe driving.

BRIEF DESCRIPTION OF THE DRWAINGS

FIG. 2 is a diagram to illustrate an internal structure of the pole of the obstacle detection device in accordance with embodiment 1 of the present invention.

FIG. 7 is a diagram to illustrate an internal structure of pole of the obstacle detection device in accordance with embodiment 2 of the present invention.

FIG. 11 is a flow chart to show an operation of the obstacle detection device in accordance with embodiment 4 of the present invention.

Figure 12A:
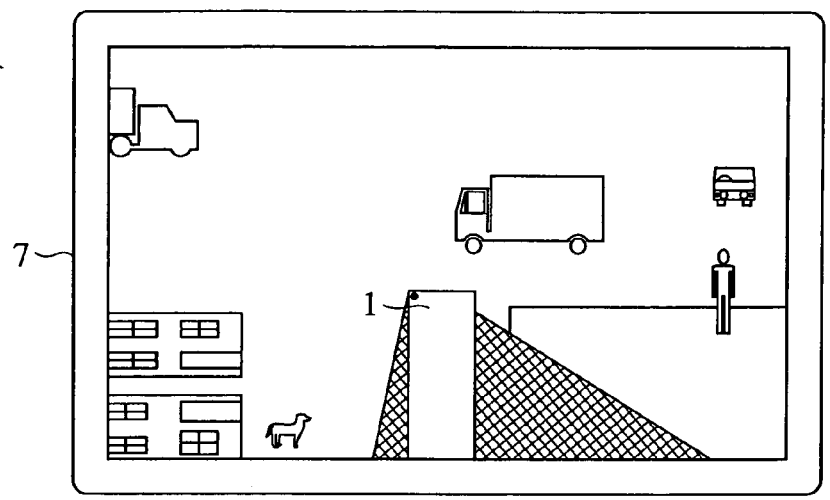
Figure 12B:
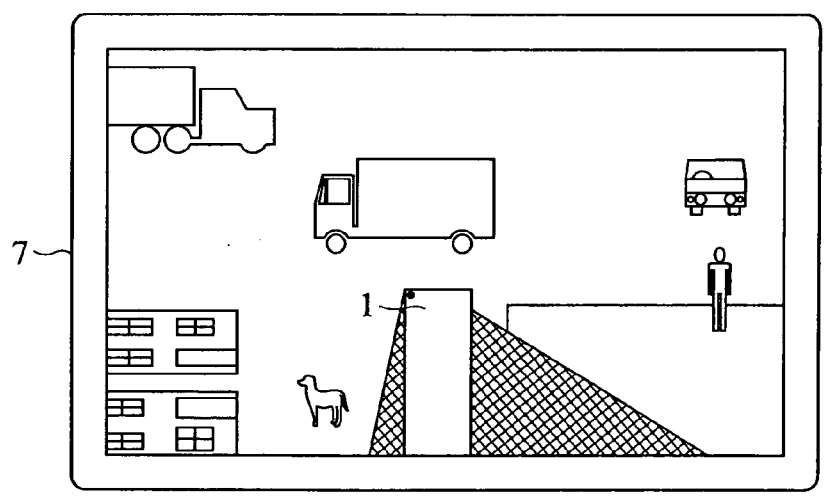
Figure 12C:
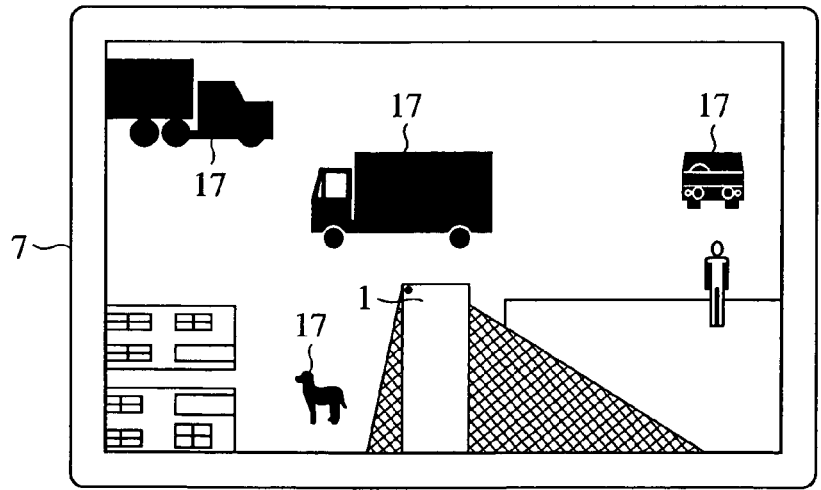

FIGS. 12A, 12B, and 12C are diagrams to illustrate an image displayed on a display unit of the obstacle detection device in accordance with embodiment 4 of the present invention.

Figure 13:
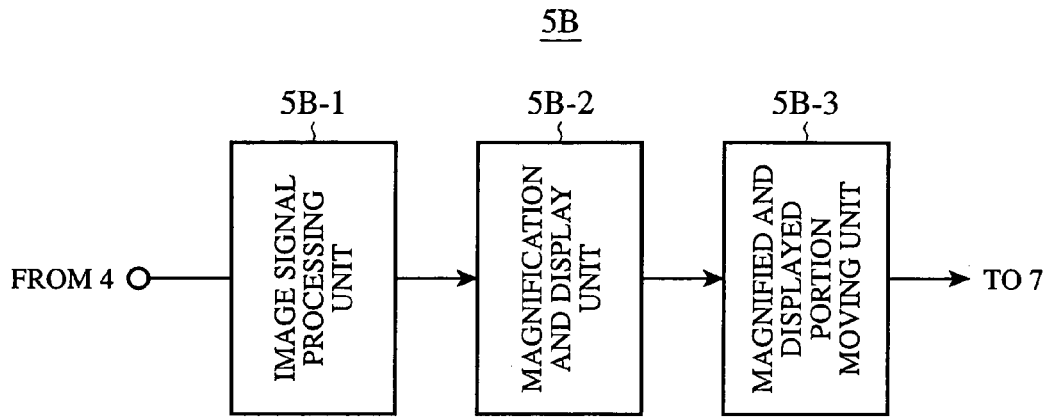

FIG. 13 is a block diagram to show a signal processing circuit of the obstacle detection device in accordance with embodiment 5 of the present invention.

Figure 14:
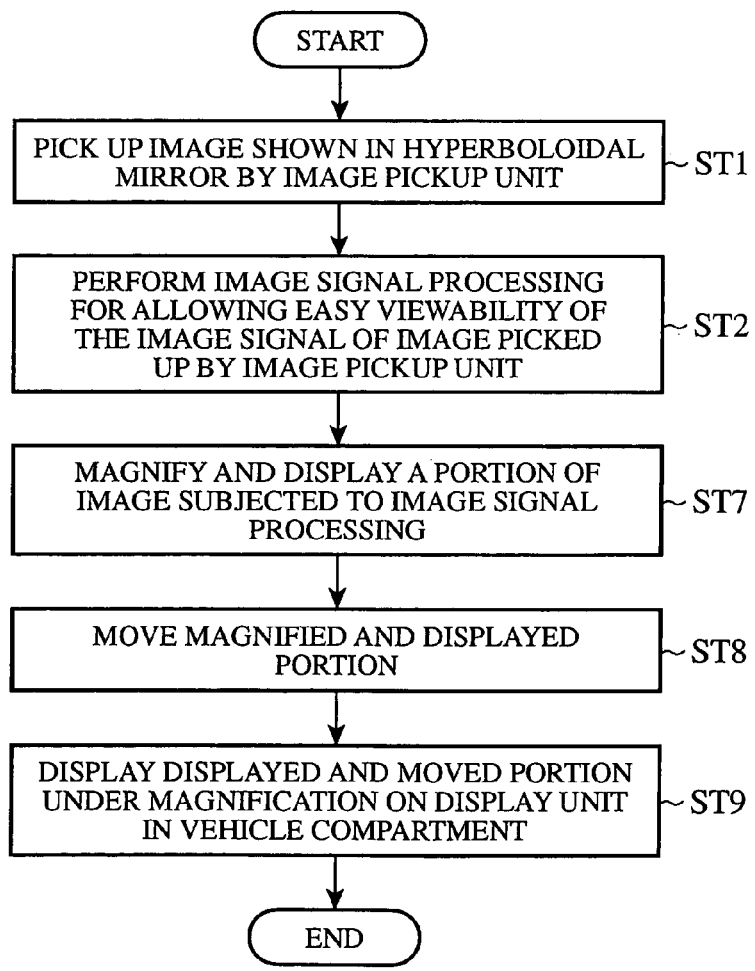

FIG. 14 is a flow chart to show an operation of the obstacle detection device in accordance with embodiment 5 of the present invention.

Figure 15:
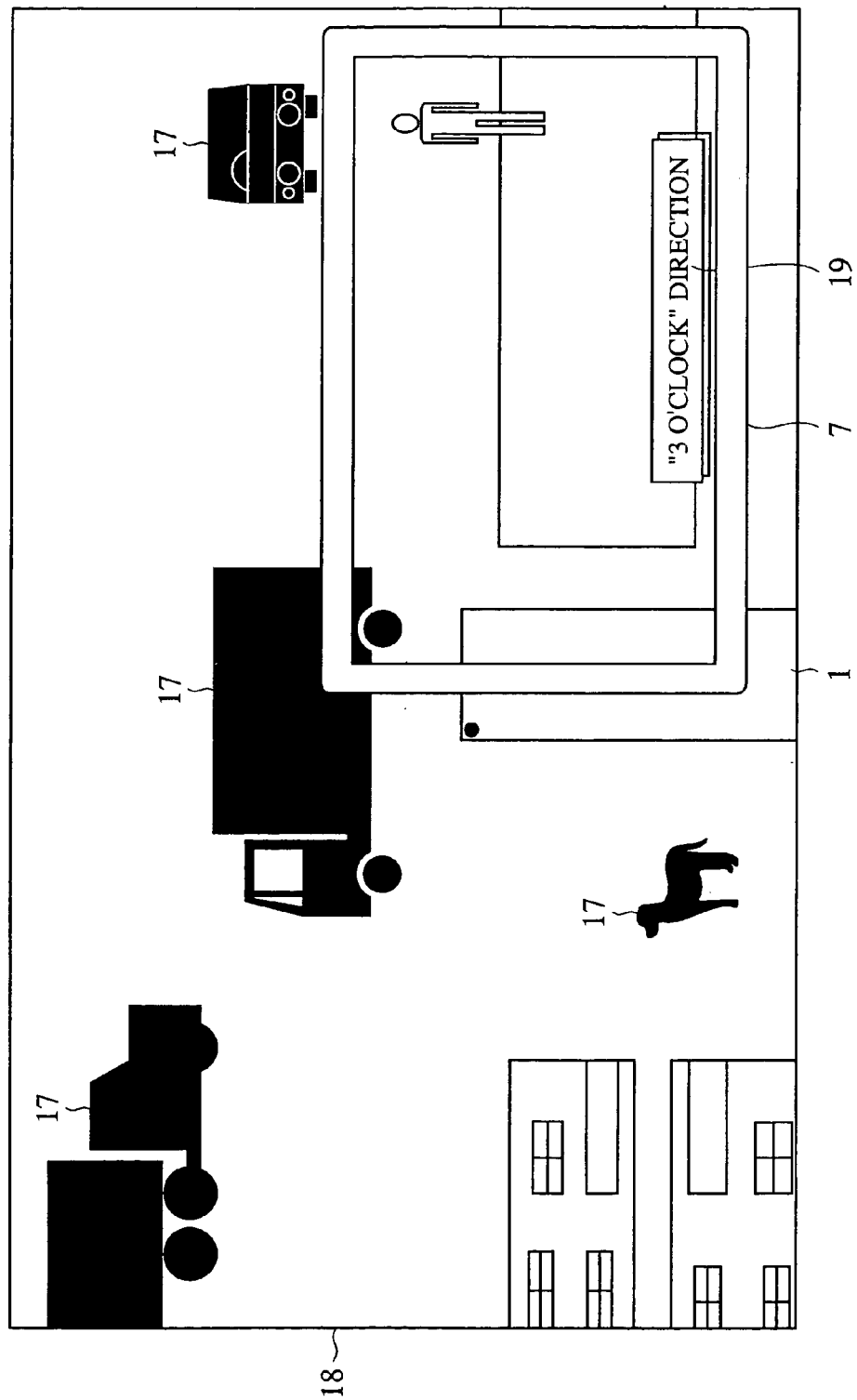

FIG. 15 is a diagram to illustrate an image displayed on a display unit of the obstacle detection device in accordance with embodiment 5 of the present invention.

Figure 16:
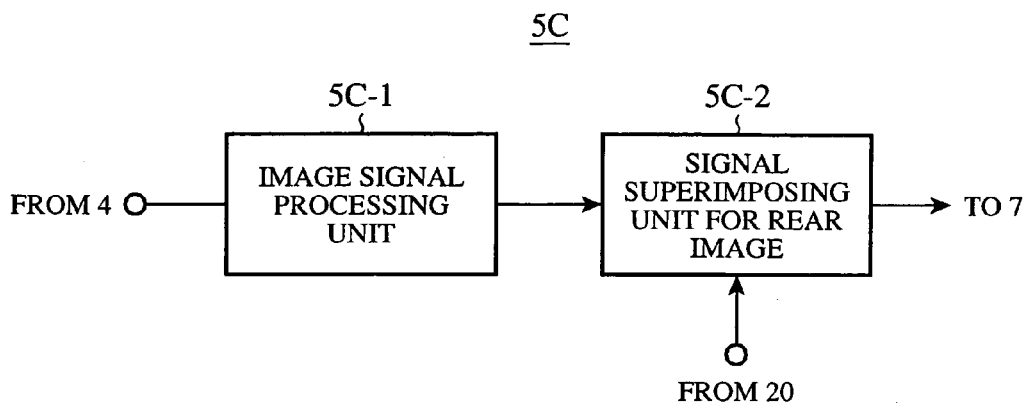

FIG. 16 is a block diagram to show a signal processing circuit of the obstacle detection device in accordance with embodiment 6 of the present invention.

Figure 17:
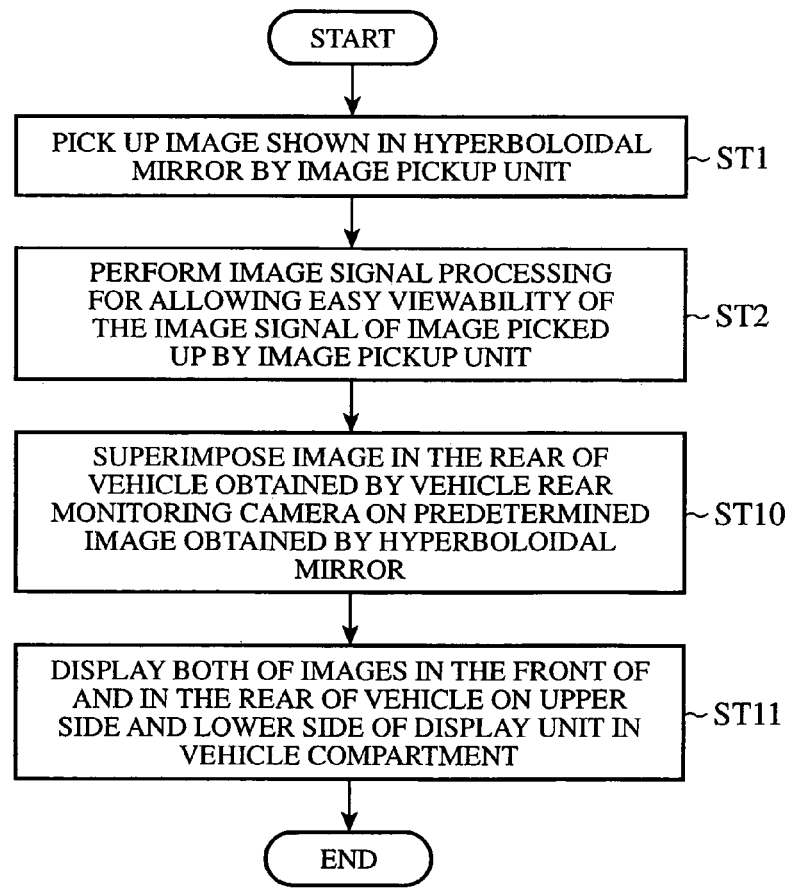

FIG. 17 is a flow chart to show an operation of the obstacle detection device in accordance with embodiment 6 of the present invention.

Figure 18:
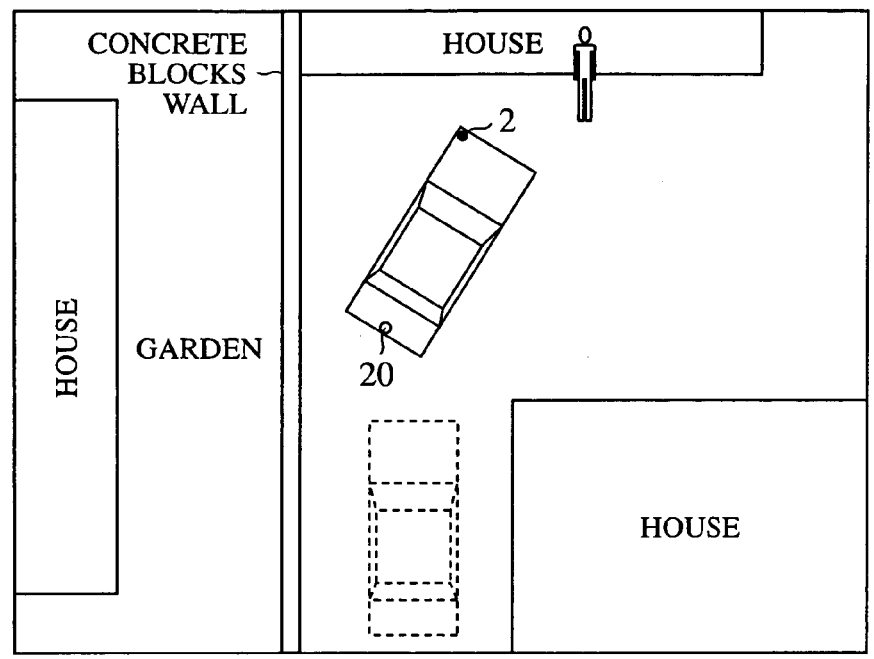

FIG. 18 is a diagram to illustrate a case where a vehicle is parked by means of the obstacle detection device in accordance with embodiment 6 of the present invention.

Figure 19:
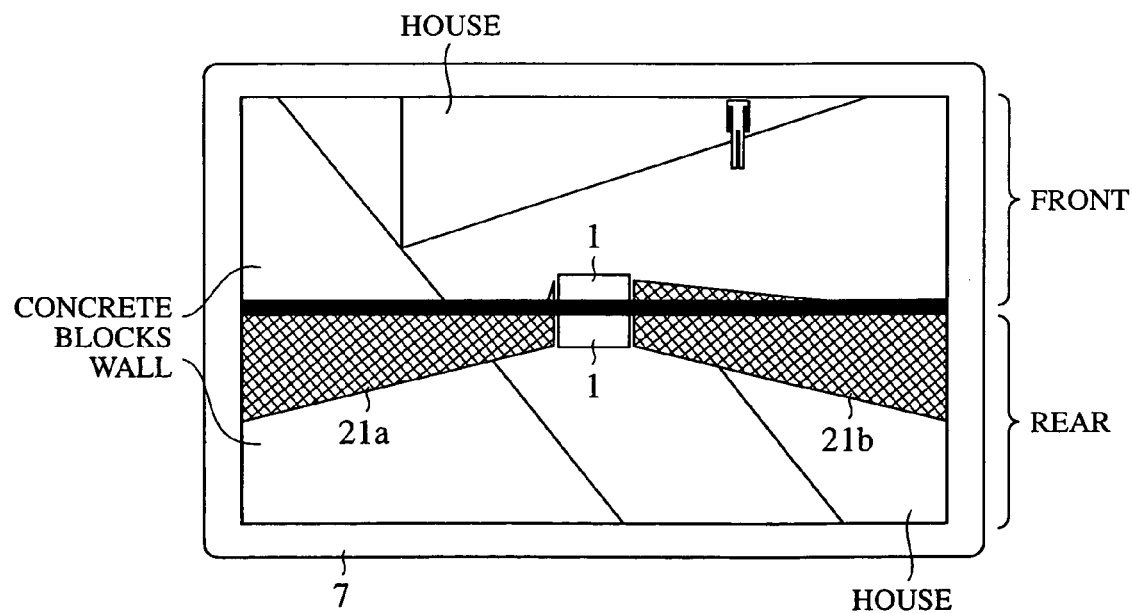

FIG. 19 is a diagram to illustrate an image displayed on a display unit of the obstacle detection device in accordance with embodiment 6 of the present invention.

Figure 20:
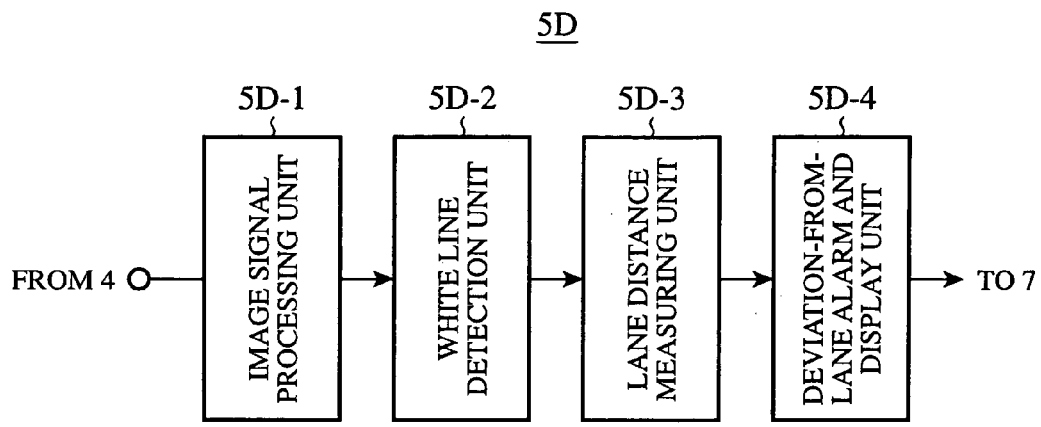

FIG. 20 is a block diagram to show a signal processing circuit of the obstacle detection device in accordance with embodiment 7 of the present invention.

Figure 21:
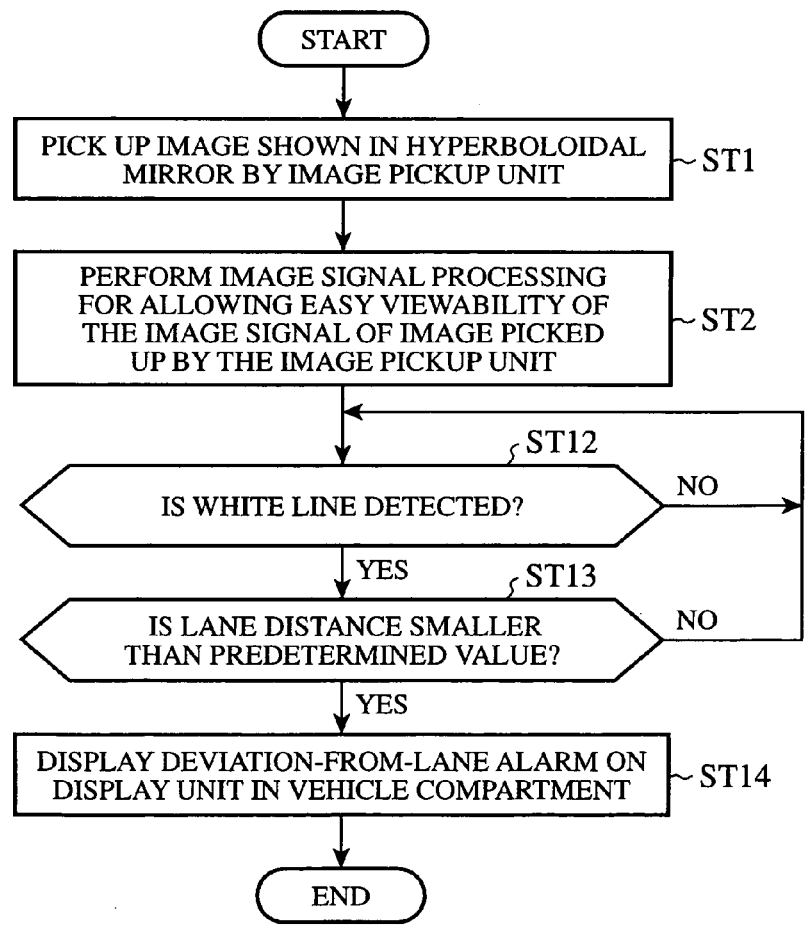

FIG. 21 is a flow chart to show an operation of the obstacle detection device in accordance with embodiment 7 of the present invention.

FIG. 22 is a diagram to illustrate an image displayed on a display unit of the obstacle detection device in accordance with embodiment 7 of the present invention.

FIG. 23 is a diagram to illustrate an image displayed on a display unit of the obstacle detection device in accordance with embodiment 7 of the present invention.

Figure 24A:
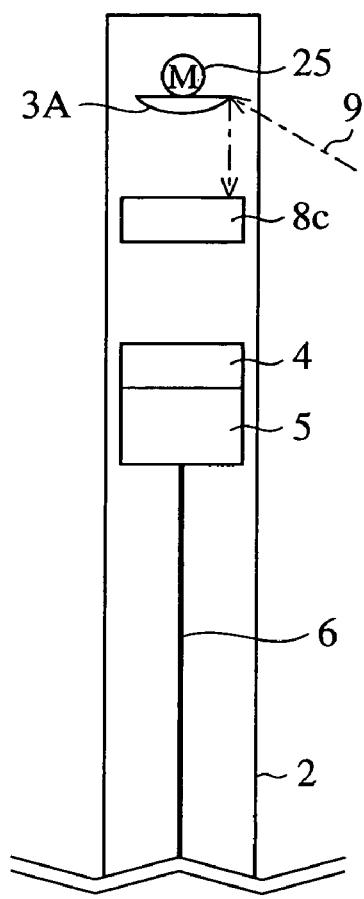
Figure 24B:
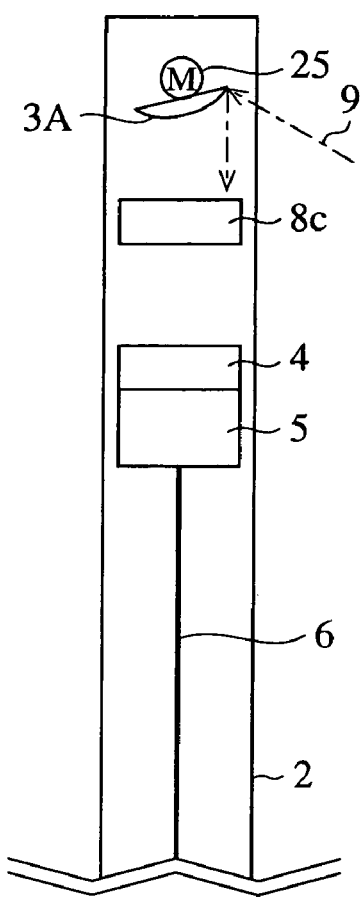

FIGS. 24A and 24B are diagrams to illustrate an internal structure of pole of the obstacle detection device in accordance with embodiment 10 of the present invention.

DESCRIPTION OF THE PREFERED EMBODIMENTS

The preferred embodiments of the present invention will be described below.

Embodiment 1

Figure 1:
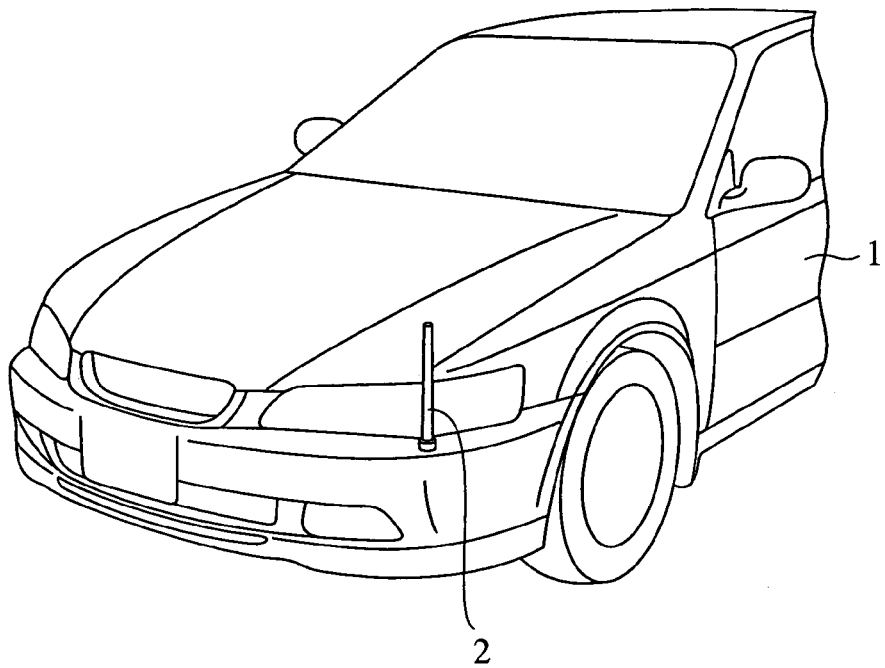
FIG. 1 is a perspective view to show a case where a pole of obstacle detection device in accordance with embodiment 1 of the present invention is mounted at the corner of a vehicle.
Figure 3:
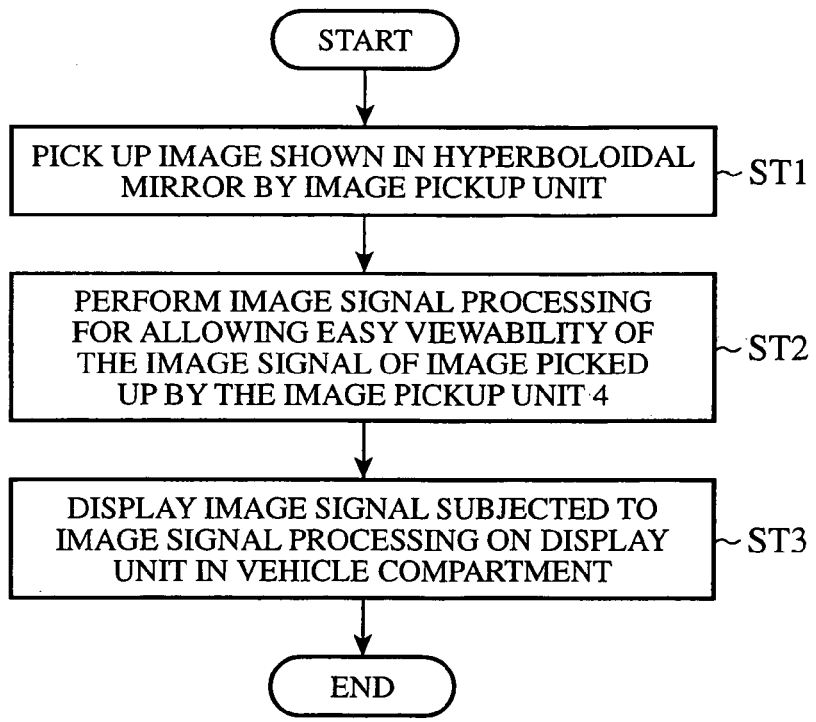
FIG. 3 is a flow chart to describe an operation of the obstacle detection device in accordance with embodiment 1 of the present invention.
Figure 4:
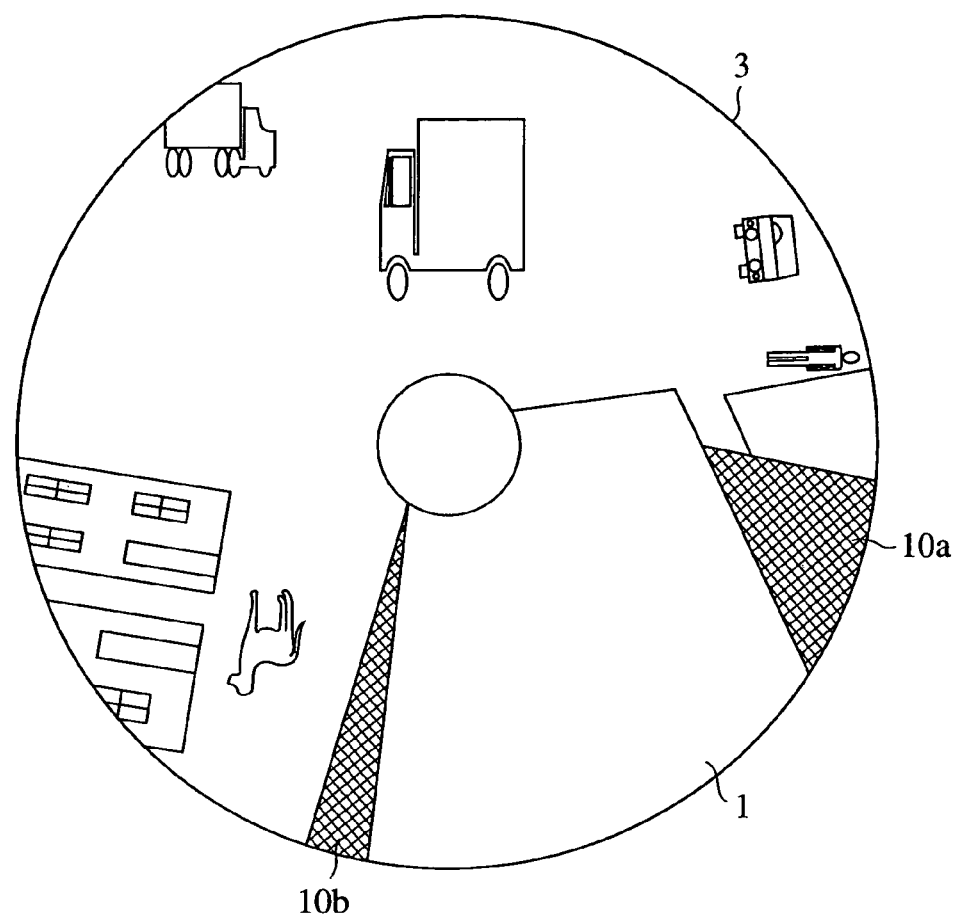
FIG. 4 is a diagram to explanatorily illustrate an image shown in a hyperboloidal mirror of the obstacle detection device in accordance with embodiment 1 of the present invention.
Figure 5:
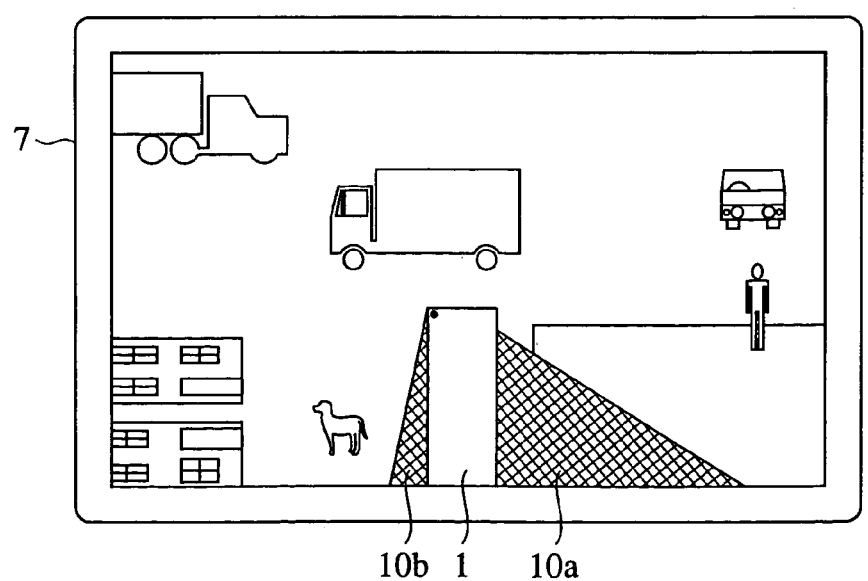
FIG. 5 is a diagram to illustrate one example of an image displayed on a display unit of the obstacle detection device in accordance with embodiment 1 of the present invention.
Figure 6:
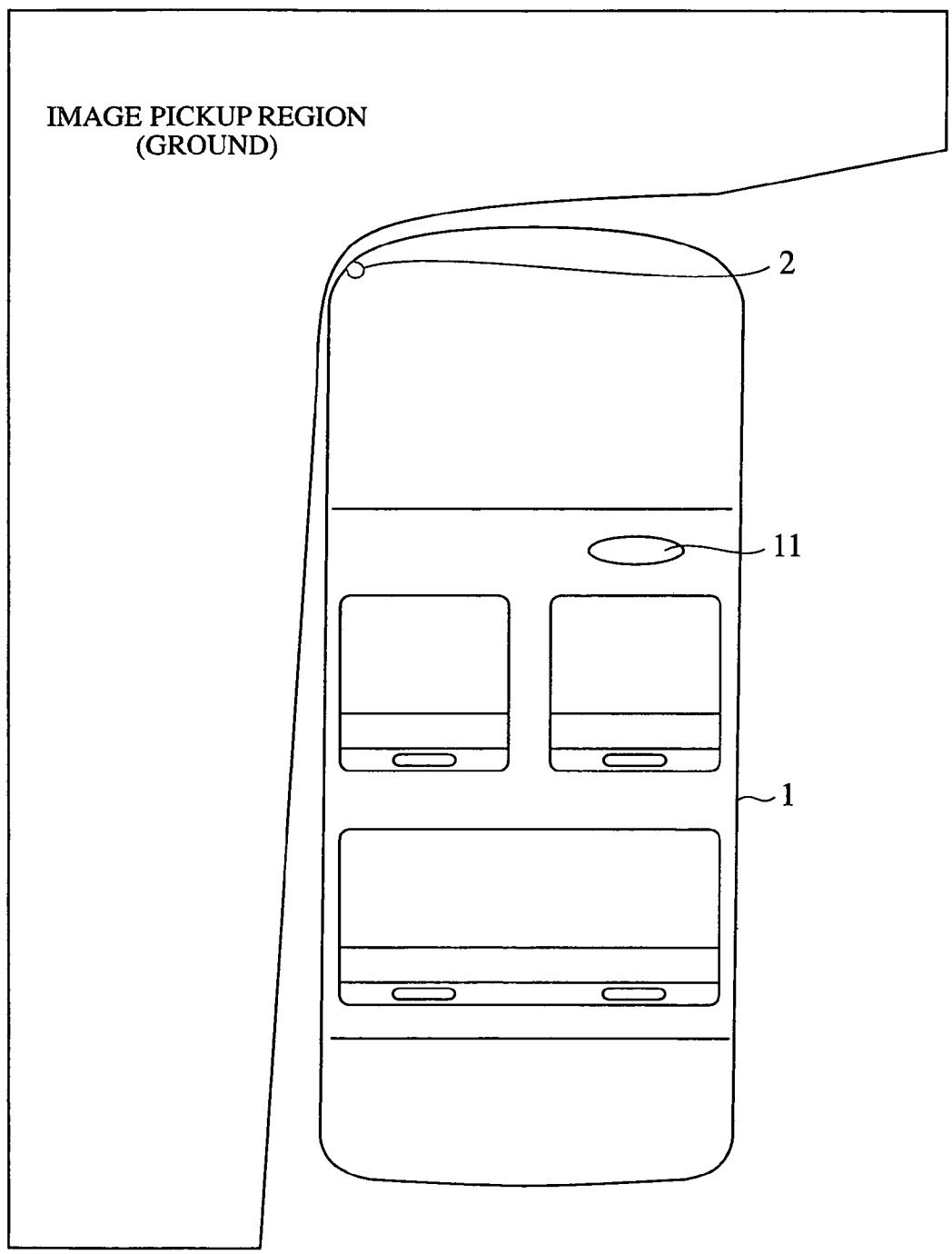
FIG. 6 is a diagram to illustrate an image pickup region of the obstacle detection device in accordance with embodiment 1 of the present invention.

FIG. 1 is a perspective view to show a case where a pole of obstacle detection device in accordance with embodiment 1 of the present invention is mounted at the corner of a vehicle. FIG. 2 is a diagram to illustrate an internal structure of the pole. FIG. 3 is a flow chart to describe an operation of the obstacle detection device in accordance with embodiment 1 of the present invention. FIG. 4 is a diagram to explanatorily illustrate an image shown in a hyperboloidal mirror of the obstacle detection device in accordance with embodiment 1 of the present invention. FIG. 5 is a diagram to illustrate one example of an image displayed on a display unit of the obstacle detection device in accordance with embodiment 1 of the present invention. FIG. 6 is a diagram to illustrate an image pickup region of the obstacle detection device in accordance with embodiment 1 of the present invention.

In FIG. 1, a fixed type pole 2 is mounted at the corner (in this case at the left front corner opposed to a right hand steering wheel 11 (FIG. 6)) of a vehicle 1 and a hyperboloidal mirror 3 is arranged in the pole 2, as shown in FIG. 2, and an image shown in the hyperboloidal mirror 3 is picked up by an image pickup unit 4 through lenses 8a, 8b which are provided in the pole 2. The hyperboloidal mirror 3 reflects an image below itself (in a region shown by light rays 9) and is formed in a shape capable of picking up the image substantially with ease by the image pickup unit 4.

The hyperboloidal mirror 3 is mounted, for example, near a tip of the pole 2 and the lenses 8a, 8b are arranged at a predetermined interval between the hyperboloidal mirror 3 and the image pickup unit 4 in the pole. These lenses 8a, 8b are provided so as to prevent the image transmitted from the hyperboloidal mirror 3 to the image pickup unit 4 from suffering an effect of the length of the pole 2. Although two lenses are provided in this example, only one lens may be applicable depending on a length of the pole 2.

The image pickup unit 4 is connected to a signal processing circuit 5 which includes image signal processing unit (not shown) conventionally used and the output side of this signal processing circuit 5 is connected through a signal line 6 to a display unit 7 (FIG. 5) which is provided in vehicle compartment of the vehicle 1. In this case, the image pickup unit 4, the signal processing circuit 5, and the signal line 6 are arranged near a root of the pole 2.

Next, operation the device will be described with reference to FIG. 3 to FIG. 5.

First, at step ST1 in FIG. 3, an image shown in the hyperboloidal mirror 3 is picked up by the image pickup unit 4. At this time, the image shown in the hyperboloidal mirror 3, as explanatorily shown in FIG. 4, includes the vehicle 1 on the right lower side in the center, blind corners 10a, 10b on both sides of the vehicle 1 which are hidden behind the vehicle 1 itself and can not be seen, and landscape around the vehicle 1 in the other region. The scene in FIG. 4 is not actual one and it is made for an explanatory example.

Next, at step ST2, an image signal processing for allowing easy viewability of the image signal of the image picked up by the image pickup unit 4 is performed by image signal processing unit in the signal processing circuit 5. At step ST3, the image signal subjected to the image signal processing is supplied to the display unit 7 in the vehicle compartment through the signal line 6 to be displayed.

At this time, an image shown in FIG. 5 is displayed on the display unit 7. This image varies depending on a height and shape of bonnet of the vehicle 1. As shown in FIG. 4, the image (FIG. 4) shown in the hyperboloidal mirror 3 seems somewhat extraordinary to understand when it is displayed on the display 7, hence, the image is subjected to the image signal processing by the image signal processing unit in the signal processing circuit so as to become easily visible and is displayed on the display unit 7 as shown in FIG. 5. In this respect, although in FIG. 5, the image is displayed as a single image having no boundary, it is also applicable that the image is displayed separately, for example, in sections of front left side, front center side, front right side, left side, vehicle, and right side. The general region in which the obstacles can be picked up by the hyperboloidal mirror 3 built in the pole 2 is shown in FIG. 6.

As described above, according to this embodiment 1, there can be produced an effect of picking up and displaying the images of obstacles in the region where a driver cannot directly visually identify the obstacles at the time when the driver enters into an intersection or the like. Further, by only one obstacle detection device, the driver can identify the obstacles in two directions (front side and left side, or front side and right side, it depends on which side the steering wheel is arranged at), which produces an effect of substantially reducing the blind corner of the driver. Still further, since the pole is mounted at such a front corner of the vehicle that is opposed to steering wheel of the vehicle, the hyperboloidal mirror built in the pole allows the driver to check a presence or absence of obstacles on the front side and the left side (or the right side) of the vehicle and is conducive to safe driving at the time when the vehicle enters into an intersection with many blind corners and it turns to the left (or turns to the right). In addition to this, the pole mounted at the corner of vehicle body is not shaped like a conventional trunk antenna, so the pole can produce an effect of providing preferable appearance in terms of styling.

Embodiment 2

FIG. 7 is a diagram to illustrate an internal structure of the fixed type pole of an obstacle detection device in accordance with embodiment 2 of the present invention. FIG. 8 is a diagram to illustrate an internal structure of an electrically retractable pole. At this point in FIG. 7 and FIG. 8, parts corresponding to those in FIG. 2 are denoted by the same reference symbols and their further descriptions will be omitted.

In FIG. 7, the image pickup unit 4 and the signal processing circuit 5 are arranged near the hyperboloidal mirror 3 mounted near the tip of the pole 2. A lens 8c is disposed between the hyperboloidal mirror 3 and the image pickup unit 4. By this structure, the structure of an optical part composed between the hyperboloidal mirror 3 and the image pickup unit 4, that is, the lens 8c, can be made simple.

Figure 8A:
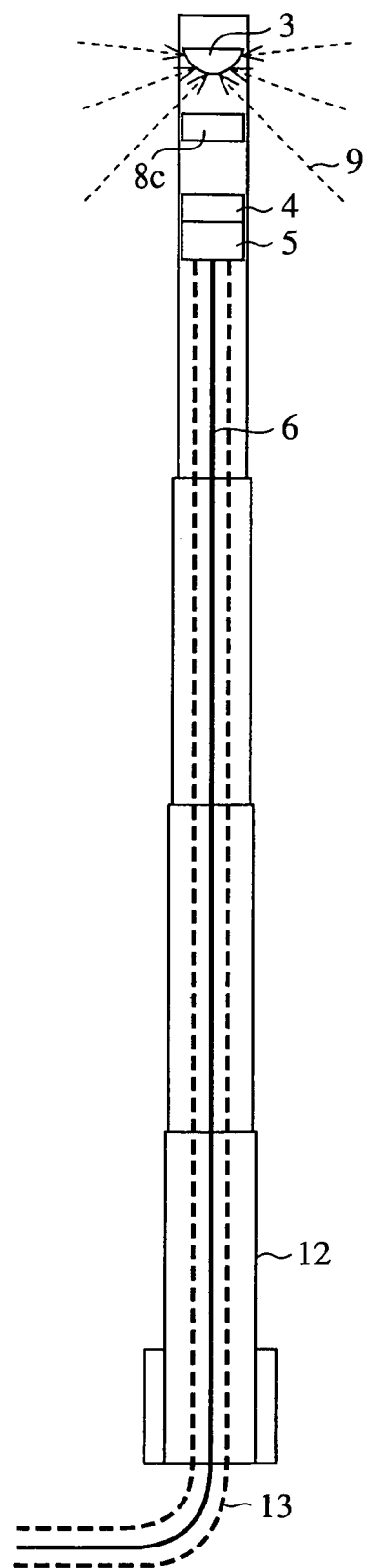
FIGS. 8A and 8B are diagrams to illustrate an internal structure of another pole of the obstacle detection device in accordance with embodiment 2 of the present invention.
Figure 8B:
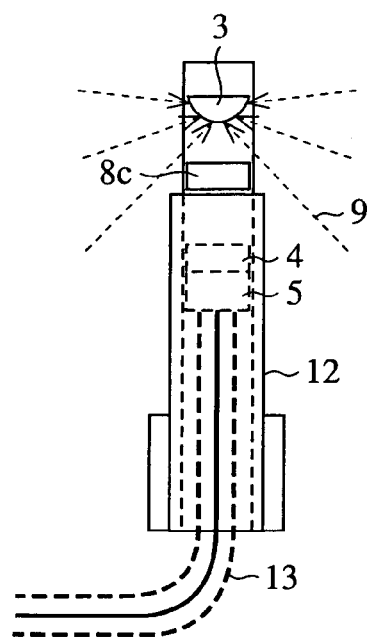

Further, FIG. 7 shows an example of fixed type pole 2, whereas FIG. 8 shows an example of electrically retractable pole 12. FIG. 8A shows the pole 12 when it is expanded and FIG. 8b shows the pole 12 when it is shortened.

In FIG. 8, the hyperboloidal mirror 3, the lens 8c, the image pickup unit 4 and the signal processing circuit 5 are arranged in a tip block (tip of 4 steps rod) of pole 12. A length of the tip block of pole 12 is made longer than the other blocks of rod such that the hyperboloidal mirror 3 protrudes even at the time in midway through expansion or shortening and at the time of shortening. Hence, although a region capable of picking up images is made narrower when the pole 12 is shortened (FIG. 8B) than when the pole is expanded (FIG. 8A), the obstacle detection device can pick up the images of the obstacles in the region where the driver cannot directly visually identify them and display them. In this manner, the embodiment shown in FIG. 8 can easily respond to also a multi step type electrically retractable pole.

As described above, according to this embodiment 2, there are produced an effect of simplifying the structure of optical part disposed between the hyperboloidal mirror and the image pickup unit and an effect of picking up and displaying the images of obstacles in the region where the driver cannot directly visually identify the obstacles. Further, since the image pickup unit is stored in the pole and, in particular, it is arranged near the hyperboloidal mirror, there is produced an effect of reducing the size and installation area of the obstacle detection device. Still further, since the pole can be expanded or shortened, there are produced an effect of easily containing the pole when unnecessary and an effect of easily responding also to the multi step type electrically retractable pole.

Embodiment 3

Figure 9:
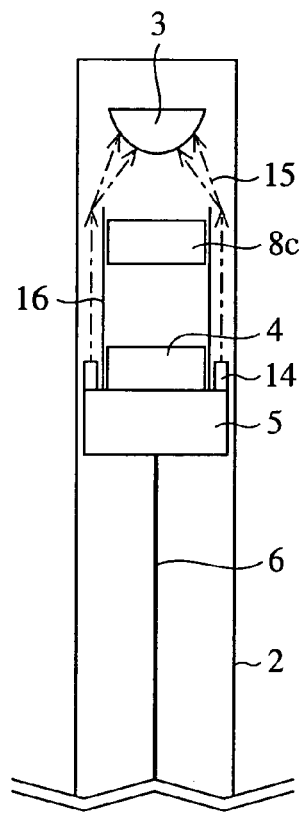
FIG. 9 is a diagram to illustrate an internal structure of pole of the obstacle detection device in accordance with embodiment 3 of the present invention.

FIG. 9 is a diagram to illustrate an internal structure of the pole of an obstacle detection device in accordance with embodiment 3 of the present invention. Here, in FIG. 9, parts corresponding to those in FIG. 7 are denoted by the same reference symbols and their further descriptions will be omitted.

In this embodiment, a light source 14 using an LED, for example, is arranged around the image pickup unit 4 to apply light rays 15 toward the hyperboloidal mirror 3 disposed near a tip of the pole 2. At this time, there is provided a shielding plate 16 so as to prevent the light of light source 14 from directly entering the image pickup unit 4. By this structure, a portion near tip of the pole 2 directly shines or indirectly shine because the hyperboloidal mirror 3 reflects light.

Hence, a function of driving support device which is usually called a neon control or the like (in which a small light is disposed on a front corner of the vehicle opposed to a steering wheel side to facilitate checking a distance between the light at a corner of the vehicle and a wall surface or the like at the time of parking the vehicle into a garage or the like) can be added to the obstacle detection device. Moreover, by increasing the amount of light of the light source 14 or by employing an infrared light source, images can be picked up even in the nighttime. In this respect, in order to pick up images in the nighttime, it is preferable to employ the so called highly sensitive image pickup unit and when head lights are lit on, brightness on the front side is extremely different from brightness on the left and right sides, which presents not so much problem.

As described above, according to this embodiment 3, the light source is arranged around the image pickup unit to irradiate the hyperboloidal mirror with light, so that the intrinsic function of neon control can be added to the pole. That is, there are produced an effect of adding the function of driving support device and an effect of picking up images in the nighttime.

Embodiment 4

Figure 10:
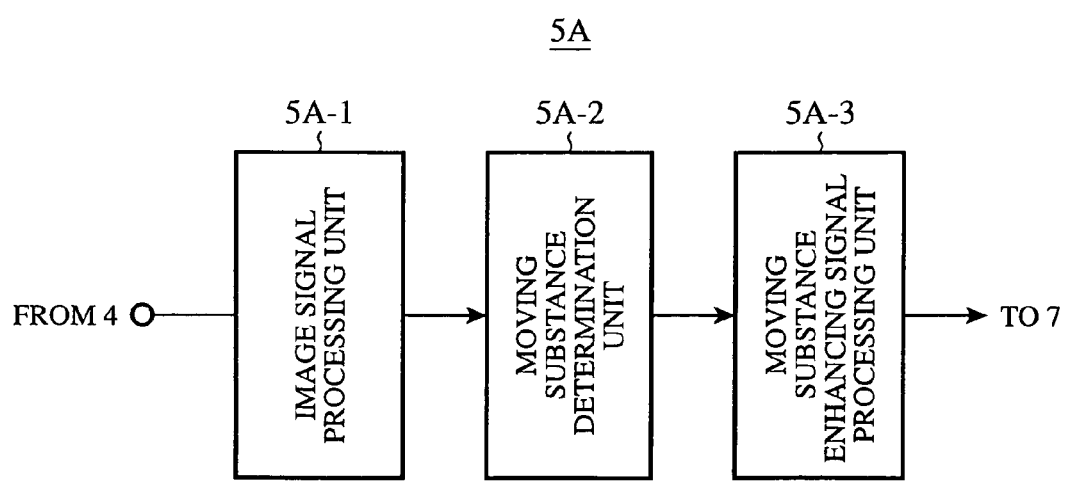
FIG. 10 is a block diagram to show a signal processing circuit of the obstacle detection device in accordance with embodiment 4 of the present invention.

FIG. 10 is a block diagram to show the signal processing circuit of an obstacle detection device in accordance with embodiment 4 of the present invention. FIG. 11 is a flow chart to show an operation of the obstacle detection device in accordance with embodiment 4 of the present invention. FIG. 12 are diagrams to illustrate a set of images displayed on the display unit of obstacle detection device in accordance with embodiment 4 of the present invention. The other structures are the same as in the above embodiments 1 to 3.

In FIG. 10, a signal processing circuit 5A includes the same image signal processing unit 5A-1 as the image signal processing unit included in the above described signal processing circuit 5 and, in addition, a moving substance determination unit 5A-2 which is connected to the image signal processing unit 5A-1 and determines whether or not an image subjected to an image signal processing by this image processing unit 5A-1 and displayed on the display unit 7 includes a moving substance, and a moving substance highlight signal processing unit 5A-3 which is connected to the moving substance determination unit 5A-2 and which facilitates to easily recognize the moving substance when the moving substance determination unit 5A-2 determines that the image includes a moving substance.

Next, operation will be described with reference to FIG. 11 and FIG. 12.

At step ST1, an image shown in the hyperboloidal mirror 3 is picked up by the image pickup unit 4, and at step ST2, the image signal processing for allowing easy viewability of the image signal of the image picked up by the image pickup unit 4 is performed by the image signal processing unit 5A-1 in the signal processing circuit 5A, and at step ST3, the image signal subjected to this image signal processing is supplied to the display unit 7 in the vehicle compartment through the signal line 6, as in the case of FIG. 3 described above.

Next, at step ST4 it is determined by the moving substance determination unit 5A-2 whether or not the image subjected to the image signal processing by the image signal processing unit 5A-1 and displayed on the display unit 7, includes a moving substance. In this case, for understandable explanation, it is supposed that the vehicle 1 stops, for example, at a road shaped like a letter T. In the image subjected to the image signal processing by the image signal processing unit 5A-1 and displayed on the display unit 7, for example, as shown in FIG. 12A, there are five objects are included, three vehicles other than the vehicle 1 itself, one person, and one dog and displayed as substances which can be moving substances. In the moving substance determination unit 5A-2 whether or not the image includes moving subject is decided by comparison of two images FIG. 12A and FIG. 12B, which are obtained in a lapse of time T. In case where the second latest image shown in FIG. 12A varies into the latest image shown in FIG. 12B during the lapse of time, it can determine the images include moving substances by difference in display position or in display size between them.

In FIG. 12B, it can be determined that three vehicles other than the vehicle 1 and one dog are moving substances 17. In this case the person is not determined as moving substance because it did not move around the time. In this manner, when it is determined at step ST4 that moving substances is included in the image, the program proceeds to step ST5 and when it is determined that no moving substance exists, the program returns to ST3 where the above operations are repeated.

At step ST5, in order to facilitate easy recognizing the moving substances 17, a processing of highlighting the moving substances 17 is performed by the moving substance highlight signal processing unit 5A-3. At step ST6, the image which is subjected to the processing of highlighting, as shown in FIG. 12C, is displayed on the display unit 7 in the vehicle compartment.

In FIG. 12C it is shown one example in which the moving substances 17 are highlighted in black. When the moving substances 17 are displayed in this manner, the driver can easily recognize the moving substances 17 which might interfere with the travel of his own vehicle or to which he must pay attention. In this case, the moving substances are highlighted in black in the above example, but it is also applicable that the moving substances may be highlighted in the other color.

As described above, according to this embodiment 4, the moving substances are detected and highlighted by the image processing in a state in which (or in a period during which) the vehicle stops, so there is produced an effect of allowing the detailed checking of the obstacles moving near to or away from the vehicle.

Embodiment 5

FIG. 13 is a block diagram to show the signal processing circuit of an obstacle detection device in accordance with embodiment 5 of the present invention. FIG. 14 is a flow chart to show an operation of the obstacle detection device in accordance with embodiment 5 of the present invention. FIG. 15 is a diagram to illustrate an image displayed on display unit of the obstacle detection device in accordance with embodiment 5 of the present invention. The other structures are the same as in the above embodiments 1 to 3.

In FIG. 13, a signal processing circuit 5B includes the same image signal processing unit 5B-1 as the image signal processing unit included in the above signal processing circuit 5 and, in addition, a magnification display unit 5B-2 which is connected to the image signal processing unit 5B-1 and magnifies a portion of picked up image, and a magnified and displayed portion moving unit 5B-3 which is connected to the magnification display unit 5B-2 and which is made to move a portion to be magnified and displayed.

Next, operation will be described with reference to FIG. 14 and FIG. 15.

At step ST1, an image shown in the hyperboloidal mirror 3 is picked up by the image pickup unit 4, and at step ST2, the image signal processing for allowing easy viewability of the image signal of the image picked up by the image pickup unit 4 is performed by the image signal processing unit 5B-1 in the signal processing circuit 5B, as in the case of FIG. 3 described above.

Next, at step ST7, a portion of the image which is picked up by the image pickup unit 4 and is subjected to the image signal processing by the image signal processing unit 5B-1 is magnified and displayed by the magnification display unit 5B-2, as shown in FIG. 15. The magnification and display of a portion of the image looks like as if the whole image picked up by the image pickup unit 4 are magnified to a magnification screen 18 and a portion of the magnification screen 18 are displayed on a display screen.

Next, at step ST8, the magnified and displayed portion is moved when it necessary. The moving of the magnified and displayed portion is equivalent to the substantial moving of the display unit 7 in FIG. 15. Further, at step ST9, the moved and displayed portion is displayed under magnification on the display unit 7. With this display, the driver can correctly check a state of the image picked up by the image pickup unit 4 in detail, for example, whether or not a person on the right side of the vehicle 1 stops and whether or not the number of persons on the right side is only one. In addition, this arrangement makes the driver move the portion to be displayed to a point about which the driver is concerned and check the point in detail. At this point, when the portion is magnified and displayed, if the direction of display is displayed on the display unit 7 (shown by a direction 19 in FIG. 15 as 3 o'clock direction), it is possible to prevent the driver from recognizing the obstacles by mistake.

In this respect, for example, if half in the vertical direction and half in the lateral direction of the image stored in a memory are displayed on the display unit 7 as the above described method of magnifying and displaying the image, the image can be displayed by two times with respect to its original size.

Further, if addresses of memory of the image to be displayed is changed, the position of the image to be magnified and displayed can be changed.

As described above, according to this embodiment 5, by magnifying and displaying a portion of the image, it is possible to check the obstacle in detail, in particular, the obstacle which is not clearly visible but is vaguely visible. Further, by moving the portion to be displayed, the driver can select the portion to be magnified according to his own selection to check the portion in detail. Still further, by displaying the direction of display at the time of magnifying and displaying the portion, there is produced an effect of preventing the driver from recognizing the obstacle by mistake.

Embodiment 6

FIG. 16 is a block diagram to show the signal processing circuit of an obstacle detection device in accordance with embodiment 6 of the present invention. FIG. 17 is a flow chart to show an operation of the obstacle detection device in accordance with embodiment 6 of the present invention. FIG. 18 is an illustration to show a state where a vehicle is parked into a garage between a concrete blocks wall and a house for explanation of operation of the obstacle detection device in accordance with embodiment 6 of the present invention. FIG. 19 is a diagram to illustrate an image displayed on the display unit of obstacle detection device in accordance with embodiment 6 of the present invention. The other structures are the same as in the above embodiments 1 to 3.

In FIG. 16, a signal processing circuit 5C includes the same image signal processing unit 5C-1 as image signal processing unit included in the above signal processing circuit 5 and in addition to this, a rear image signal superimposing unit 5C-2 which is connected to the image signal processing unit 5C-1 and superimposes an image obtained by picking up the rear of vehicle 1 by a vehicle rear monitor camera 20 on an image obtained by picking up the front of the vehicle 1 by the pole 2.

Next, operation will be described with reference to FIG. 17 to FIG. 19. In this case, it will be described as an example, a case where the vehicle 1 is parked into a garage between a concrete blocks wall and a house as shown in FIG. 18.

At step ST1, an image shown in the hyperboloidal mirror 3 is picked up by the image pickup unit 4 and at step ST2, an image signal processing for allowing easy viewability of the image signal of the image picked up by the image pickup unit 4 is performed by the image signal processing unit 5C-1 in the signal processing circuit 5C, as in the case of FIG. 3 described above. In this case, the image obtained through the step ST1 and step ST2 is an image in the front of the vehicle 1 picked up by the pole 2 in the state shown in FIG. 18.

At step ST10, when a shift lever of the vehicle 1 is set in a "Rear Mode" for back gear, an image in the rear of the vehicle 1 picked up by the vehicle rear monitor camera 20 is superposed on the image in the front of the vehicle 1 picked up by the hyperboloidal mirror 3 in the pole 2 by the rear image signal superimposing unit 5C-2.

Next, at step ST11, as shown in FIG. 19, as one example, the image in the front of the vehicle 1 in the state shown in FIG. 18 is displayed on an upper side of the display unit 7 and the image in the rear of the vehicle 1 is displayed on a lower side of the display unit 7. In other words, in this case, the driver can recognize a motion of the person by the image in the front of the vehicle 1 displayed on the upper side of the display unit 7 and an existence of some obstacle by the image in the rear of the vehicle 1 displayed on the lower side of the display unit 7. Here, the image in the rear of the vehicle 1 has blind corners (21*a*, 21*b*).

By this arrangement, both of the images in the front of and in the rear of the vehicle 1 are displayed on the upper side and lower side of one display unit 7 at the same time, so the driver can check safety in the front of and in the rear of the vehicle 1 at the same time.

In this respect, in the above description has been described a case where both of the images in the front of and in the rear of the vehicle 1 are displayed at the same time. However, when images on the left side, in the front of and in the rear of the vehicle 1 are displayed at the same time, the driver can perform a parallel parking of the vehicle 1 with more safety and reliability (in a case for parallel parking of right hand steering wheel, left side driving, and parking at left side end).

As described above, according to this embodiment 6, displaying of both of the images in the front of and in the rear of the vehicle on one display screen at the same time can provide an effect of performing safety check in the front of and in the rear of the vehicle at the same time, and further, displaying of the images on the left side and in the front of and in the rear of the vehicle at the same time can produce an effect of safe driving with more safety and reliability for parallel parking.

Embodiment 7

FIG. 20 is a block diagram to show the signal processing circuit of an obstacle detection device in accordance with embodiment 7 of the present invention. FIG. 21 is a flow chart to show an operation of the obstacle detection device in accordance with embodiment 7 of the present invention. FIG. 22 and FIG. 23 are diagrams to illustrate images displayed on the display unit of obstacle detection device in accordance with embodiment 7 of the present invention, respectively. The other structures are the same as in the above embodiments 1 to 3.

In FIG. 20, a signal processing circuit 5D includes the same image signal processing unit 5D-1 as the image signal processing unit included in the above signal processing circuit 5 and in addition to this, a white line detection unit 5D-2 which is connected to the image signal processing unit 5D-1 and detects a driving lane line on a road, for example, a white line from the image signal processed by the image signal processing unit 5D-1, a lane distance measuring unit 5D-3 which is connected to the white line detection unit 5D-2 and measures a distance between the vehicle 1 and the white line detected by the white line detection unit 5D-2, and a deviation-from-lane alarm and display unit 5D-4 which is connected to the lane distance measuring unit 5D-3 and determines whether or not such a distance between the vehicle 1 and the white line that is determined by the lane distance measuring unit 5D-3 is smaller than a predetermined value and displays an alarm when the distance between the white line and the vehicle 1 is smaller than the predetermined value. In this case, the driving lane line is supposed to be white line, however, the driving lane line may be a lane line of other color, for example, yellow lane line.

Next, operation will be described with reference to FIG. 21 to FIG. 23.

At step ST1, an image shown in the hyperboloidal mirror 3 is picked up by the image pickup unit 4 and at step ST2, an image signal processing for allowing easy viewability of the image signal of the image picked up by the image pickup unit 4 is performed by the image signal processing unit 5D-1 in the signal processing circuit 5D, as in the case of FIG. 3 described above.

Next, at step ST12, white lines 23*a* to 23*c* provided on both sides of a median separation line 22 on the road are detected by the white line detection unit 5D-2 from the image signal subjected to the image signal processing by the image signal processing unit 5D-1, and in a case where the white lines 23*a* to 23*c* are not detected, the program waits until they are detected and when they are detected, the program proceeds to step ST13. At step ST13, the measurement of lane distance is made. Then it is determined whether or not the distances between the white lines 23*a* to 23*c* and the vehicle 1 is smaller than the predetermined values of criteria for determination. If the distances between the white lines 23*a* to 23*c* and the vehicle 1 are larger than the predetermined values, the program returns to step ST12 where the above operation is repeated, and if the distances between the white lines 23*a* to 23*c* and the vehicle 1 are smaller than the predetermined values, a deviation-from-lane alarm is displayed at step ST14.

FIG. 22 and FIG. 23 show images (24*a*-1, 24*b*-1) displayed on the display unit 7 at the time of ST 13 and signals (24*a*-2, 24*b*-2) of No. n-th line of the image signal. At this point the No. n-th line designates a line to display a place on which the pole mounted on the left front corner of the vehicle 1 is displayed.

At the time of the state shown in 24a-1 of FIG. 22, the image signal 24a-2 of the No. n-th line shows that the vehicle 1 is located at a position of a time T1 from the left end of display unit 7 and that a left white line 23b is located at a position of a time T2 before the vehicle 1. When the state shown in 24b-1 of FIG. 23 is brought, the image signal 24b-2 of the No. n-th line shows that the vehicle is located at a position of a time T1 from the left side end of the display unit 7 and that the left white line 23b is located before a time T3 from the vehicle 1. By a measurement in advance, it can be found how many distances (cm, for example) the above times T2, T3 correspond to.

Hence, because the time length T2 is monitored continuously and when the distance smaller than the predetermined value continues for n seconds, it is possible to display a deviation-from-lane alarm.

In this respect, it is also applicable to define conditions for displaying the deviation-from-lane alarm as follows: the distance becomes smaller than the predetermined value m times or more within a predetermined period of time.

As described above, according to this embodiment 7, it is possible to produce an effect of adding a deviation-from-lane alarm function of by a simple sensor and hence to contribute to safe driving.

Embodiment 8

In this respect, in the above embodiment 7, the deviation-from-lane alarm is displayed when the distance smaller than the predetermined value continues for n seconds. However, the conditions, that is, criteria for determination for displaying the deviation-from-lane alarm may be changed in response to a running speed of the vehicle 1. For example, when the vehicle 1 runs at high speeds, the "n seconds" are decreased, and when the vehicle 1 runs at low speeds, the "In seconds" are increased.

As described above, according to this embodiment 8, by changing the criteria for determination for displaying the alarm in response to the running speed, it is possible to produce an effect of allowing the driver to respond to the actual conditions of the vehicle 1.

Embodiment 9

In addition, in the above embodiments 1 to 8, the pole for containing the hyperboloidal mirror 3 may be utilized also as a vehicle mounted antenna. For example, if the pole 2 is made of metal and an antenna cable is connected to the metal portion of the pole 2 and is pulled into the vehicle compartment of the vehicle 1, the pole 2 can be utilized as an antenna of a radio device mounted in the vehicle compartment.

As described above, according to this embodiment 9, by utilizing the pole for containing the hyperboloidal mirror as the vehicle mounted antenna, the pole substantially has a plurality of functions, so there is provided an effect of realizing space saving and cost reduction for each function.

Embodiment 10

FIG. 24 is a diagram to illustrate the internal structure of a pole of the obstacle detection device in accordance with embodiment 10 of the present invention. FIG. 24A is a diagram to illustrate a reference position and FIG. 24B is a diagram to illustrate a position where right field of view is magnified. Here, in FIG. 24, the parts corresponding to those in FIG. 7 are denoted by the same reference symbols and their further detailed descriptions will be omitted.

In FIG. 24, in this embodiment, a hyperboloidal mirror 3A having a large radius of curvature is used as a hyperboloidal mirror and a micro motor 25 is used as drive unit for driving the hyperboloidal mirror 3A. The other structures are the same as in the case of FIG. 7.

This embodiment is intended for further reducing a size of the pole 2 which contains the hyperboloidal mirror and the image pickup unit and the like. When the hyperboloidal mirror is reduced in size, if the hyperboloidal mirror is reduced in size in a state where the hyperboloidal mirror 3 covering the wide region as described above keeps its shape, the hyperboloidal mirror causes an image having relatively large distortion, which in turn increases load placed on the image signal processing unit included in the signal processing circuit for processing the image into an easily visible image. However, as shown in FIG. 24A, if the radius of curvature of the hyperboloidal mirror 3A is enlarged, the load placed on the image signal processing unit relating to the distortion of the image is decreased.

Further, as shown in FIG. 24B, if the hyperboloidal mirror 3A is driven by the micro motor 25 to change the direction of the hyperboloidal mirror 3A, the region in which the image pickup unit 4 can pick up images via the hyperboloidal mirror 3a can be substantially changed.

As described above, according to this embodiment 10, by enlarging the radius of curvature of the hyperboloidal mirror to reduce the distortion of images, there are produced effects of reducing the size of hyperboloidal mirror and reducing load placed on the image signal processing unit. Further, since the radius of curvature of the hyperboloidal mirror is large, the field of view is narrowed, but by changing the direction of the hyperboloidal mirror by the motor, there is produced an effect of visually recognizing obstacles in a desired direction.

In the above described embodiments, the description has been given that the whole signal processing circuit 5 is contained in the pole 2. However, in a case where the whole signal processing circuit 5 can not be contained in the pole 2, it is recommended to make the following appropriate provisions:

(1) A signal processing unit is provided in a path of the pole 2 to the display unit 7 to contain a part or the whole of the signal processing circuit 5.
(2) A part or the whole of the signal processing circuit 5 is contained in the case of the display unit 7.

What is claimed is:

1. An obstacle detection device comprising:
a hyperboloidal mirror which is contained near a tip of a pole mounted at a corner of a vehicle;
an image pickup unit which picks up an image shown in the hyperboloidal mirror;
a signal processing unit that performs an image signal processing for allowing easy viewability of the image picked up by the image pickup unit; and
a display unit that is mounted in a vehicle compartment of the vehicle and displays an image signal processed by the signal processing unit.

2. The obstacle detection device as claimed in claim 1, wherein the pole is mounted at a front corner of the vehicle opposed to a steering wheel of the vehicle.

3. The obstacle detection device as claimed in claim 1, wherein the image pickup unit is contained in the pole.

4. The obstacle detection device as claimed in claim 1 further comprising a light source that is arranged around the image pickup unit and irradiates the hyperboloidal mirror with light.

5. The obstacle detection device as claimed in claim 1, wherein the signal processing unit is provided with a moving substance determination unit for determining whether or not the image picked up by the image pickup unit includes a moving substance and a moving substance highlight signal processing unit for subjecting the moving substance determined by the moving substance determination unit to a signal processing so as to easily identify the moving substance.

6. The obstacle detection device as claimed in claim 1, wherein the signal processing unit is provided with a magnification and display unit that magnifies and displays a portion of the image picked up by the image pickup unit and a magnified displayed portion moving unit that moves the magnified and displayed portion by the magnification and display unit.

7. The obstacle detection device as claimed in claim 1, wherein the signal processing unit is provided with a rear image signal superimposing unit that displays the image displayed by the display unit and an image of a vehicle rear monitoring camera at the same time when a shift lever of the vehicle is set in a "Rear Mode" for back gear.

8. The obstacle detection device as claimed in claim 1, wherein the signal processing unit is provided with: a driving lane detection unit for detecting a driving lane on a road; a lane distance measuring unit for determining whether or not a distance between a side of the vehicle and the driving lane detected by the driving lane detection unit is smaller than a predetermined value; and a deviation-from-lane alarm unit that displays an alarm when a state where the lane distance measuring unit determines that the distance is smaller than the predetermined value continues for a predetermined period of time.

9. The obstacle detection device as claimed in claim 8, wherein the deviation-from-lane alarm unit varies the predetermined value of a criterion for display of the alarm in response to a running speed of the vehicle.

10. The obstacle detection device as claimed in claim 1, wherein the pole for containing the hyperboloidal mirror is utilized also as a vehicle mounted antenna.

11. The obstacle detection device as claimed in claim 1 further comprising a drive unit capable of changing a direction of the hyperboloidal mirror, wherein the hyperboloidal mirror has a large radius of curvature.

12. The obstacle detection device as claimed in claim 1, wherein said signal processing unit is disposed in said pole.

13. The obstacle detection device as claimed in claim 1, wherein said signal processing unit is disposed underneath said image pickup unit.

* * * * *